F. M. VANSICKLE.
ILLUMINATED SIGN.
APPLICATION FILED JUNE 23, 1921.
1,389,799.
Patented Sept. 6, 1921.
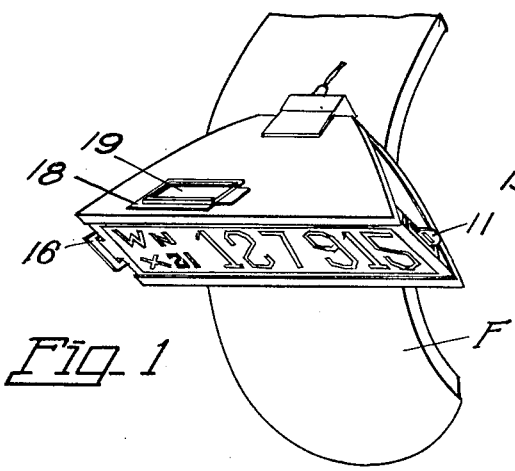
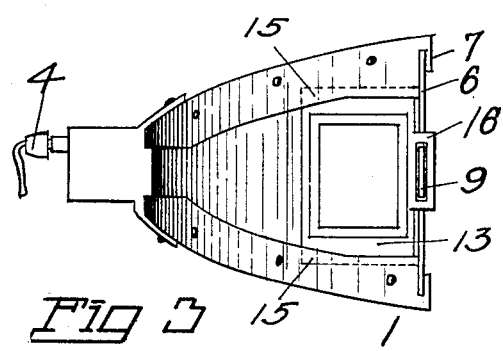
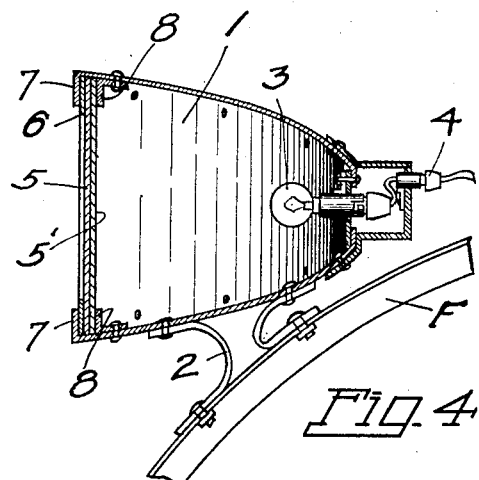
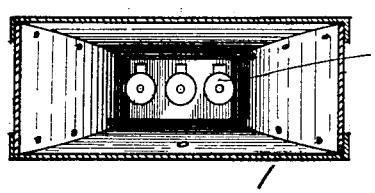
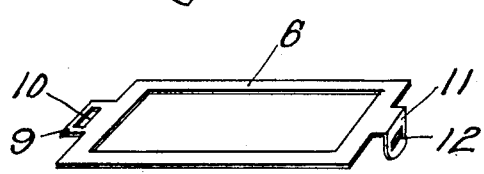
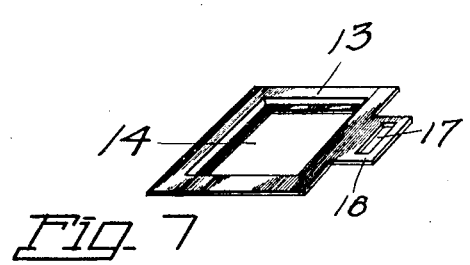
Inventor
Fred M. Vansickle
By Herbert E. Smith
Attorney

UNITED STATES PATENT OFFICE.

FRED M. VANSICKLE, OF LEWISTON, IDAHO.

ILLUMINATED-SIGN.

1,389,799.   Specification of Letters Patent.   Patented Sept. 6, 1921.

Application filed June 23, 1921. Serial No. 479,718.

*To all whom it may concern:*

Be it known that I, FRED M. VANSICKLE, a citizen of the United States, residing at Lewiston, in Nez Perce county, and State of Idaho, have invented certain new and useful Improvements in Illuminated Signs, of which the following is a specification.

My present invention relates to improvements in illuminated signs, adapted especially for use with vehicles, as automobiles for displaying and illuminating the license plate or tag at the rear thereof. The primary object of the invention is the provision of a sign or exhibitor for the license plate by means of which the license, a photograph of the owner, and the license receipt, or other data may be preserved and exhibited, in compliance with the traffic laws of the several States. To this end the invention consists in certain novel combinations and arrangements of parts in connection with the illuminated sign whereby the devices carrying the license and necessary data may be locked or sealed in their places to prevent tampering therewith and to prevent loss or theft of these articles.

In the accompanying drawings I have illustrated one complete example of the physical embodiment of my invention wherein the parts are combined and arranged according to the best mode that I have so far devised for the practical application of the principles of my invention.

Figure 1 is a perspective view, looking down upon the device of the invention showing the sign attached to one of the rear wheel fenders or guards.

Fig. 2 is a face view of the illuminated sign.

Fig. 3 is a side view of the sign depicting a photograph holder which forms one of the essential features of the invention for locking parts thereof.

Fig. 4 is a transverse vertical sectional view through the sign casing showing its attachment to the wheel guard, the lamp, and the license plate.

Fig. 5 is a longitudinal sectional view through the lamp casing.

Fig. 6 is a perspective view of the slide, locking frame at the rear of the license plate.

Fig. 7 is a perspective view of the exterior, the photograph frame, which co-acts with the interior, and the license plate frame in locking the parts together.

In the preferred form of the invention as illustrated in the drawings the sign casing is indicated as a whole by the numeral 1, and is attached by bracket 2 in usual manner to one of the rear wheel fenders or guards F as in Figs. 1 and 4. The sign casing is made up of metal plates and fashioned to proper form to inclose a plurality of electric lamps 3 that have suitable connections at the rear and designated as 4 and the interior faces of the walls of the casing are polished to act as reflectors for the rays of light emanating from the lamps. Three lamps are shown in Fig. 5, one of which is utilized under normal conditions, and the remaining two may be used in case of emergency.

At the open front of the lamp casing are located the rectangular glass plate or window 5 and the inner stenciled license plate 5′, and at the exterior of the glass plate or window 5 is utilized the locking frame 6. As best seen in Fig. 6 this frame is stamped from a rectangular metal plate, and provided with an open center through which the license number is visible, and the plate is adapted to slide between the glass plate 5 and the horizontal flanges 7 at the top and bottom of the casing, to the position indicated in Fig. 2. Within the casing are upper and lower angle plates or guides 8 complementary to the flanges 7, and between these angular plates or strips and the flanges the locking frame 6, the plate glass 5 and the license plate 5′ are retained.

At one end the frame 6 is fashioned with a projecting tongue 9 having a vertical slot 10, and this tongue, as seen in Figs. 1 and 2 projects, when the frame is in normal position, beyond the left end of the casing. At the opposite end of the locking frame 6, an integral angular locking lug 11 is provided, which also has a vertical slot 12 therein located in a plane at right angles to that of the slot 10 of the tongue 9.

This longitudinally disposed locking frame 6 is adapted to co-act with a transversely disposed frame 13 located at the side of the lamp casing as in Fig. 3.

The frame 13, which is rectangular in shape and preferably of metal is provided with a transparent window 14 of celluloid or of other suitable material and is adapted to hold and retain a photograph of the licensee of the vehicle, and is retained at the side of the lamp casing in horizontal brackets 15 which form a pocket for the reception of the photograph holder. At one side of the frame 13 is provided an extension or plate 16 which is slotted at 17 to receive and perform the functions of a keeper for the slotted latch or tongue 9 of the slide frame 6. When in proper position these frames 6 and 13 are disposed at right angles with the slotted tongue 9 projecting through the slotted keeper 16 and the angular lug 11 at the other end of the frame 6 projecting beyond the casing. These parts may be now sealed or locked in position by means of locking or sealing devices at both ends of the slide frame 6, passed through the respective slots 10 and 12, and the sealing may be performed by a State official or other authorized person against loss, theft, or tampering with the license plate.

The color red may be employed within the lamp casing for displaying a red light through the perforated, stenciled license plate, as a tail lamp for the vehicle, and the reflecting surfaces of the casing may accordingly be coated with red, or red incandescent lamps may be used if desired.

In addition to the described features of the illuminated sign, a metallic pocket or receptacle 18 is provided at the top of the lamp casing for the reception and retention of a slide 19, which may carry or bear the official receipt for payment of the fee and certificate of the licensee or owner of the automobile, for convenient inspection by authorized parties, as is required under certain conditions.

From the above description taken in connection with my drawings it is apparent that I have provided a compactly arranged and convenient instrumentality for carrying, locking, and displaying the necessary data of the licensee, which also performs the functions of a tail light for the vehicle. The illuminated signs thus equipped are made in standard form and sizes and the device is adapted to receive the standard form of license plates, and convenient size of photograph to be utilized in the holder at the exterior of the lamp casing, a different license plate and photograph of course being used for each vehicle, but when once placed in use, these parts are sealed against loss or theft.

Having thus fully described my invention, what I claim as new and desire to secure by Letters Patent is—

The combination in an illuminated sign with a lamp casing having complementary flanges and retaining plates, of a license plate, a transparent plate and an open slide frame supported in said complementary members, said slide frame having a front slotted tongue and a rear angular slotted lug projecting beyond the casing, an exterior display device having a slotted keeper plate to receive the slotted tongue, and sealing devices for the ends of said slide frame.

In testimony whereof I affix my signature.

FRED M. VANSICKLE.